United States Patent
Sato et al.

(10) Patent No.: US 9,022,154 B2
(45) Date of Patent: May 5, 2015

(54) ONE-MAN RIDING MOBILE APPARATUS

(71) Applicants: Kuniaki Sato, Tokyo (JP); Yasunori Beppu, Kanagawa (JP); Sahoko Gohira, Tokyo (JP); Kento Iino, Kanagawa (JP); Sho Iwata, Kanagawa (JP)

(72) Inventors: Kuniaki Sato, Tokyo (JP); Yasunori Beppu, Kanagawa (JP); Sahoko Gohira, Tokyo (JP); Kento Iino, Kanagawa (JP); Sho Iwata, Kanagawa (JP)

(73) Assignee: Kuniaki Sato, Tokyo (JP)

( * ) Notice: Subject to any disclaimer, the term of this patent is extended or adjusted under 35 U.S.C. 154(b) by 0 days.

(21) Appl. No.: 14/342,574

(22) PCT Filed: Jan. 23, 2013

(86) PCT No.: PCT/JP2013/051298
§ 371 (c)(1),
(2) Date: Mar. 4, 2014

(87) PCT Pub. No.: WO2014/115265
PCT Pub. Date: Jul. 31, 2014

(65) Prior Publication Data
US 2015/0008058 A1  Jan. 8, 2015

(51) Int. Cl.
*A63C 5/08* (2006.01)
*A63C 17/01* (2006.01)
(Continued)

(52) U.S. Cl.
CPC ............. *A63C 17/011* (2013.01); *A63C 17/12* (2013.01); *B62D 11/04* (2013.01)

(58) Field of Classification Search
CPC ........ B62K 3/007; B62D 51/02; B62D 57/00; B62D 61/00; A63C 17/12

USPC ........... 180/7.1, 6.48, 236, 252, 313, 21, 218, 180/338, 344.15, 344.16, 290, 181, 273
See application file for complete search history.

(56) References Cited

U.S. PATENT DOCUMENTS 5,971,091 A * 10/1999 Kamen et al. ................. 180/218
6,302,230 B1 * 10/2001 Kamen et al. ................. 180/171
(Continued)

FOREIGN PATENT DOCUMENTS

JP 2004-345608 A 12/2004
JP 2004-359094 A 12/2004
(Continued)

OTHER PUBLICATIONS

International Search Report for International Application No. PCT/JP2013/051298, Mar. 5, 2013 (2 pages).
(Continued)

*Primary Examiner* — Brodie Follman
(74) *Attorney, Agent, or Firm* — Osha Liang LLP

(57) ABSTRACT

A one-man riding mobile apparatus includes a plurality of wheels, a board-shaped boarding base to which the wheels are attached, a motor that drives at least a part of the wheels and provided on the boarding base, a plurality of load sensors provided on the boarding base, a plurality of vibrators provided on the boarding base, and a control circuit that performs driving control of the motor and driving control of the vibrators. The control circuit is provided on the boarding base and includes a center-of-gravity position detecting section that detects presence of weighting and a center-of-gravity position based on signals output from the load sensors, a motor driving control section that controls a driving operation of the motor depending on the presence of the weighting and the center-of-gravity position detected by the center-of-gravity position detecting section, and a vibrator driving control section.

15 Claims, 6 Drawing Sheets

(51) Int. Cl.
*A63C 17/12* (2006.01)
*B62D 11/04* (2006.01)

(56) References Cited

U.S. PATENT DOCUMENTS

| | | | |
|---|---|---|---|
| 6,543,564 B1* | 4/2003 | Kamen et al. | 180/89.13 |
| 6,561,294 B1* | 5/2003 | Kamen et al. | 180/21 |
| 6,802,381 B1* | 10/2004 | Koors et al. | 180/7.1 |
| 7,004,271 B1* | 2/2006 | Kamen et al. | 180/21 |
| 7,178,614 B2* | 2/2007 | Ishii | 180/7.1 |
| 7,275,607 B2* | 10/2007 | Kamen et al. | 180/7.1 |
| 7,363,993 B2* | 4/2008 | Ishii | 180/7.1 |
| 7,481,291 B2* | 1/2009 | Nishikawa | 180/218 |
| 7,703,568 B2* | 4/2010 | Ishii | 180/218 |
| 7,779,939 B2* | 8/2010 | Kamen et al. | 180/7.1 |
| 8,170,780 B2* | 5/2012 | Field et al. | 701/124 |
| 8,403,095 B1* | 3/2013 | Ecklein | 180/290 |
| 8,467,941 B2* | 6/2013 | Field et al. | 701/49 |
| 2001/0032743 A1* | 10/2001 | Kamen et al. | 180/7.1 |
| 2002/0121394 A1* | 9/2002 | Kamen et al. | 180/41 |
| 2003/0155167 A1* | 8/2003 | Kamen et al. | 180/272 |
| 2003/0205419 A1* | 11/2003 | Kamen et al. | 180/21 |
| 2004/0007398 A1* | 1/2004 | Amsbury et al. | 180/7.1 |
| 2004/0011573 A1* | 1/2004 | Kamen et al. | 180/7.1 |
| 2004/0016584 A1* | 1/2004 | Kamen et al. | 180/218 |
| 2004/0050611 A1* | 3/2004 | Kamen et al. | 180/287 |
| 2004/0055795 A1* | 3/2004 | Kamen et al. | 180/7.1 |
| 2004/0055796 A1* | 3/2004 | Kamen et al. | 180/21 |
| 2004/0069543 A1* | 4/2004 | Kamen et al. | 180/7.1 |
| 2005/0121866 A1* | 6/2005 | Kamen et al. | 280/47.18 |
| 2005/0126832 A1* | 6/2005 | Amsbury et al. | 180/7.1 |
| 2006/0011398 A1* | 1/2006 | Kamen et al. | 180/218 |
| 2006/0249313 A1* | 11/2006 | Kamen et al. | 180/7.1 |
| 2007/0145697 A1* | 6/2007 | Kamen et al. | 280/11 |
| 2010/0033315 A1* | 2/2010 | Kamen et al. | 340/441 |

FOREIGN PATENT DOCUMENTS

| | | |
|---|---|---|
| JP | 2005-210452 A | 8/2005 |
| JP | 2006-1384 A | 1/2006 |
| JP | 2006-217952 A | 8/2006 |
| JP | 2006-256401 A | 9/2006 |

OTHER PUBLICATIONS

Written Opinion for International Application No. PCT/JP2013/051298, Mar. 5, 2013 (3 pages).

* cited by examiner (a) CHASSIS (b) UPPER COVER

ONE-MAN RIDING MOBILE APPARATUS

TECHNICAL FIELD

The present invention relates generally to a one-man riding mobile apparatus and more particularly to a mobile apparatus capable of carrying out running control by movement of a center of gravity of a person.

BACKGROUND ART

In recent years, attention is paid to a so-called "personal mobility (one-man riding mobile apparatus)" as a mobile apparatus of a new type which runs with a person carried. A typical example of the personal mobility includes Segway (registered trademark) which has already been available on the market. Moreover, an experimental car of the personal mobility is provided from each of companies, for example, TOYOTA, HONDA, SUZUKI and the like. In these personal mobilities, it is possible to adjust direct advance or turns by simply inclining a body to move a center of gravity.

Moreover, a personal mobility having such a style as to ride on a skateboard is also proposed (for example, see Patent Documents 1 to 4). Also in the personal mobilities described in the Patent Documents 1 to 4, it is possible to carry out running control by movement of a center of gravity of a person. The personal mobilities described in the Patent Documents 1 to 4 have smaller sizes as compared with commercially available cars or experimental cars which are offered from the respective companies. Therefore, they are relatively suitable for carrying and storage even if there are deficiencies.

Patent Document 1: Japanese Laid-Open Patent Publication No. 2004-345608
Patent Document 2: Japanese Laid-Open Patent Publication No. 2004-359094
Patent Document 3: Japanese Laid-Open Patent Publication No. 2006-217952
Patent Document 4: Japanese Laid-Open Patent Publication No. 2006-256401

In the technologies described in the Patent Documents 1 to 4, a motion of a personal mobility such as a turning angle or a running speed is determined depending on any position on a board to which a center of gravity is to be moved. However, the center of gravity is required to be moved sensibly by a boarding person. In some cases, therefore, a motion of the personal mobility intended or predicted by the boarding person is not coincident with an actual motion of the personal mobility which is varied depending on a position of the center of gravity on the board. For this reason, it is difficult for the boarding person to steer the personal mobility as intended by himself or herself.

SUMMARY OF THE INVENTION

One or more embodiments of the present invention may provide a one-man riding mobile apparatus of such a structure type as to have a wheel disposed on a board-shaped boarding base in which running control can be carried out by movement of a center of gravity of a boarding person, in which a motion of the one-man riding mobile apparatus that is varied depending on presence of weighting for the boarding base or the position of the center of gravity on the boarding base is transmitted clearly to the boarding person, thereby enabling the boarding person to steer the one-man riding mobile apparatus as intended by the boarding person himself or herself.

One or more embodiments of the present invention may include a plurality of load sensors provided on a board-shaped boarding base, a plurality of vibrators provided on the boarding base, and a control circuit for carrying out driving control of the vibrators. In the control circuit, presence of weighting and a center-of-gravity position may be detected based on signals output from the load sensors, and the driving operation of the vibrators may be controlled in response to a motion of the one-man riding mobile apparatus which is varied depending on the presence of the weighting and the center-of-gravity position that are detected.

According to one or more embodiments of the present invention having the structure described above, for example, when the boarding person rides on the one-man riding mobile apparatus to carry out running control by the movement of the center of gravity, the presence of the weighting on the load sensor and the center-of-gravity position on the boarding base at that time are detected and a vibration corresponding to the motion of the one-man riding mobile apparatus which is to be varied depending on the presence of the weighting and the center-of-gravity position is transmitted to the boarding person by the vibrators. Consequently, in one or more embodiments, the boarding person can grasp the motion of the one-man riding mobile apparatus which is varied depending on the presence of the weighting and the center-of-gravity position through the vibration transmitted from a bottom of a foot, thereby steering the one-man riding mobile apparatus as intended by himself or herself.

DETAILED DESCRIPTION OF THE EMBODIMENTS OF THE INVENTION

One or more embodiments according to the present invention will be described below with reference to the drawings.

Figure 1:
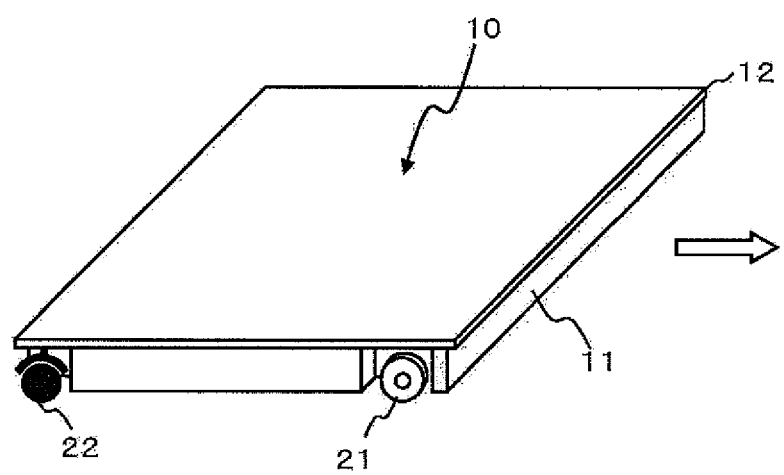
FIG. 1 is a schematic perspective view showing an external appearance of a one-man riding mobile apparatus (a personal mobility) according to one or more embodiments of the present invention.

FIG. 1 is a schematic perspective view showing an external appearance of a one-man riding mobile apparatus (a personality mobility) according to one or more embodiments. Moreover, FIG. 2 is a view showing an external shape of the one-man riding mobile apparatus according to one or more embodiments, and (a) is a front view, (b) is a side view, (c) is a plan view and (d) is a bottom view.

Figure 2:
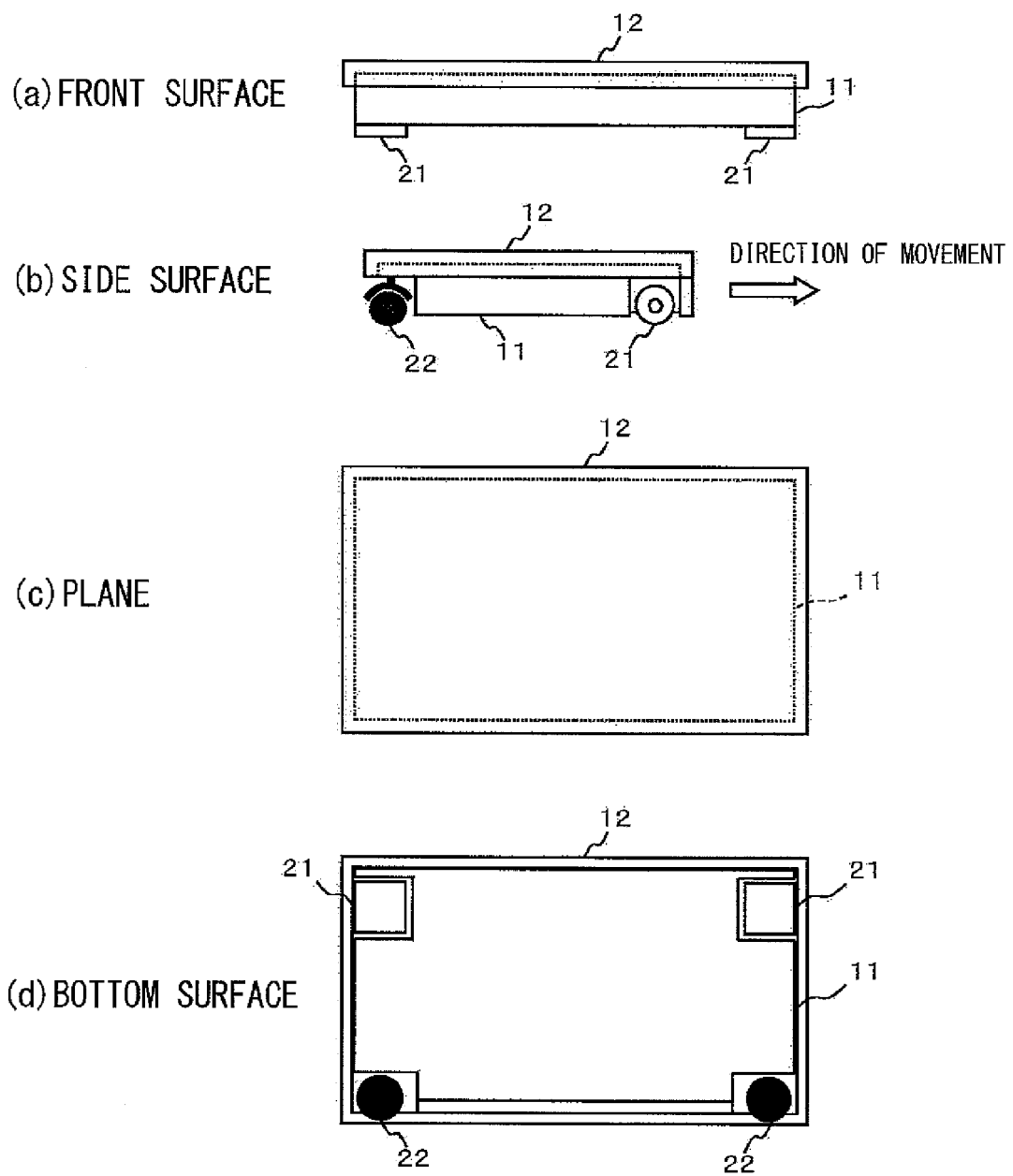
FIG. 2 is a view showing an external shape of the one-man riding mobile apparatus according to one or more embodiments of the present invention, a) being a front view, (b) being a side view, (c) being a plan view and (d) being a bottom view.

As shown in FIGS. 1 and 2, the one-man riding mobile apparatus according to one or more embodiments is of a structure type in which wheels 21 and 22 are provided on a board-shaped boarding base 10 and can carry out running control by movement of a center of gravity of a boarding person. In other words, the boarding person performs boarding in a rising state with both feet put on the boarding base 10 and moves the center of gravity longitudinally and transversely, thereby enabling direct advance, lateral turns and a running speed to be controlled.

As shown in FIG. 2(d), the one-man riding mobile apparatus according to one or more embodiments includes four wheels 21 and 22. Two front wheels 21 in the four wheels 21 and 22 are driving wheels to be driven independently by two motors (not shown) provided in the boarding base 10, respectively. Moreover, the two residual rear wheels 22 are casters of such a type that rotation can be carried out freely by 360 degrees. The caster to be used for the rear wheel 22 may be a double wheel caster of such a type that two wheels are arranged in parallel and are thus used like a single wheel.

The boarding base 10 has the four wheels 21 and 22 attached to a bottom part thereof, and furthermore, accommodates a motor for driving the two driving wheels 21, a control circuit and a battery (which are not shown). The boarding base 10 has an almost rectangular plane and the four wheels 21 and 22 are attached to the vicinity of four corners thereof. Consequently, it is possible to ensure a running stability when the boarding person rides on the one-man riding mobile apparatus.

Figure 3:
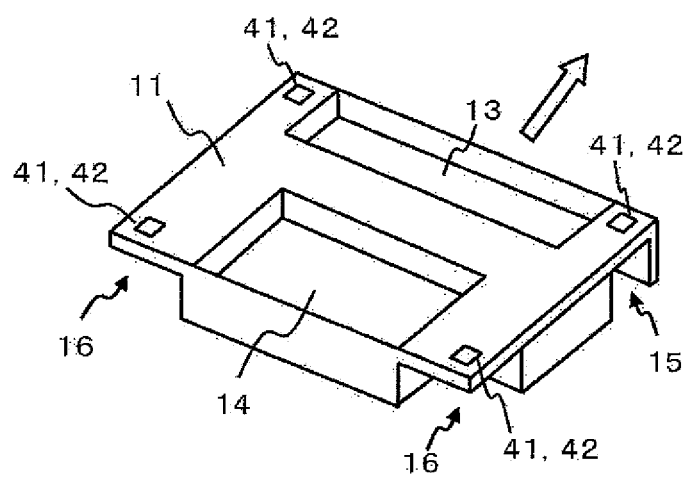
FIG. 3 is a view showing an example of a structure of a boarding base according to one or more embodiments of the present invention, (a) being a view showing a chassis and (b) being a view showing an upper cover.
Figure 3:
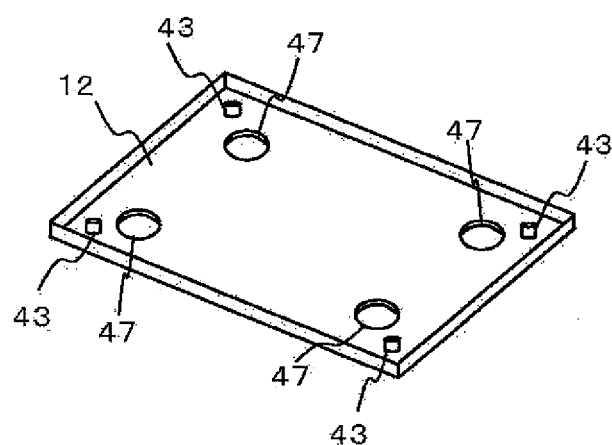
Figure 4:
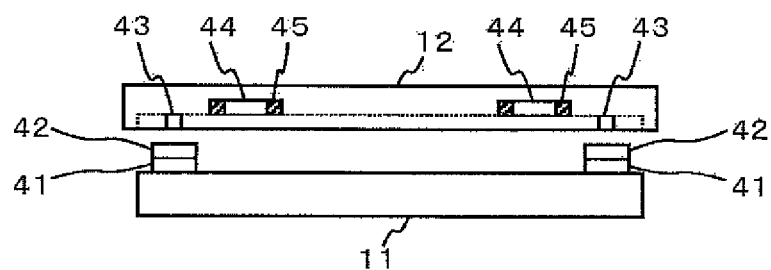
FIG. 4 is a schematic view showing each deformed structure provided in the boarding base according to one or more embodiments of the present invention.

The boarding base 10 is configured from a chassis 11 for accommodating the motor, the control circuit and the battery therein, and an upper cover 12 to be put on the chassis 11. FIG. 3 is a view showing an example of a structure of the boarding base 10, and (a) shows the chassis 11 and (b) shows the upper cover 12. Moreover, FIG. 4 is a schematic view showing each deformed structure provided on the boarding base 10 (which will be specifically described later).

As shown in FIG. 3(a), the chassis 11 includes a motor housing 13 for accommodating the motor and a circuit housing 14 for accommodating the battery and the control circuit. Moreover, a space 15 for a front wheel and a space 16 for a rear wheel are formed on four corners of the chassis 11. The space 15 for a front wheel serves to attach the driving wheel 21 to be the front wheel. The space 16 for a rear wheel serves to attach the caster 22 to be the rear wheel.

On the other hand, the upper cover 12 takes a shape of a box in which almost perpendicular side walls to the board are provided on four sides of the board taking the almost rectangular shape as shown in FIG. 3(b). The reason is that the upper cover 12 is to be prevented from being flexed easily by a weight when a boarding person rides on the upper cover 12. As a matter of course, it is also possible to prevent the upper cover 12 from being flexed by constituting the upper cover 12 by a metallic material having great rigidity or increasing a thickness of the upper cover 12.

The one-man riding mobile apparatus according to one or more embodiments includes a plurality of load sensors 41 provided on the boarding base 10. As shown in FIGS. 3(a) and 4, four load sensors 41 are provided in the vicinity of the four corners of the boarding base 10 (more specifically, a surface of the chassis 11 on a side where the upper cover 12 is to be attached). In one or more embodiments, the load sensor 41 takes a rectangular shape having a thickness of approximately 0.5 mm and a surface thereof is covered with an aluminum plate 42 which is thin in a thickness of 1 mm or less.

On the other hand, the upper cover 12 includes struts 43 in opposed positions to the four load sensors 41 over an opposed surface to the chassis 11 (a back face of the upper cover 12) as shown in FIGS. 3(b) and 4. The strut 43 takes a cylindrical shape having a height of approximately 1 mm and has a circular sectional area which is smaller than an area of the load sensor 41. When the upper cover 12 is put on the chassis 11, the opposed surfaces of the chassis 11 and the upper cover 12 are brought into a non-contact state over surfaces other than the strut 43 by the strut 43.

As described above, the upper cover 12 takes the shape of the box so as not to be easily flexed for the following reason. More specifically, the chassis 11 and the upper cover 12 are to maintain the non-contact state over the surface other than the strut 43 even if the boarding person rides on the upper cover 12. In other words, weighting is to be accurately carried out for the load sensor 41 by a weight of the boarding person through the strut 43 when the boarding person rides on the upper cover 12.

As described above, moreover, the surface of the load sensor 41 is covered with the thin aluminum plate 42 for the following reason. More specifically, force applied to the strut 43 having a smaller area than the load sensor 41 is to be dispersed into a wide range by the aluminum plate 42, thereby carrying out uniform weighting over the whole surface of the load sensor 41. In the case in which the load sensor 41 takes a shape of a button battery having a circular section and a diameter thereof and a diameter of the strut 43 are designed to be almost equal to each other, it is possible to omit the aluminum plate 42. Also in the case in which the strut 43 is set to take a shape of a square pole and a sectional area thereof and the area of the load sensor 41 are designed to be almost equal to each other, alternatively, it is possible to omit the aluminum plate 42.

As shown in FIG. 4, moreover, the one-man riding mobile apparatus according to one or more embodiments has a plurality of vibrators 44 provided on the boarding base 10. The vibrator 44 takes a shape of a button battery having a circular section. In one or more embodiments, furthermore, a vibration blocking member 45 is provided around the vibrators 44 respectively. The vibration blocking member 45 serves to block transmission of a vibration generated by the vibrator 44. The vibration blocking member 45 is constituted by a ring-shaped rubber, for example.

As shown in FIG. 3(b), circular holes 47 for accommodating the vibrators 44 are formed on the back face of the upper cover 12. The vibrator 44 and the ring-shaped vibration blocking member 45 provided therearound are accommodated in the circular hole 47 formed on the back face of the upper cover 12.

As shown in FIGS. 3(b) and 4, four vibrators 44 are provided in close positions to a center of the upper cover 12 from the load sensors 41 (the struts 43 opposed thereto), that is, positions opposed to a sole of a foot when a person rides on a defined position of the upper cover 12.

Figure 5:
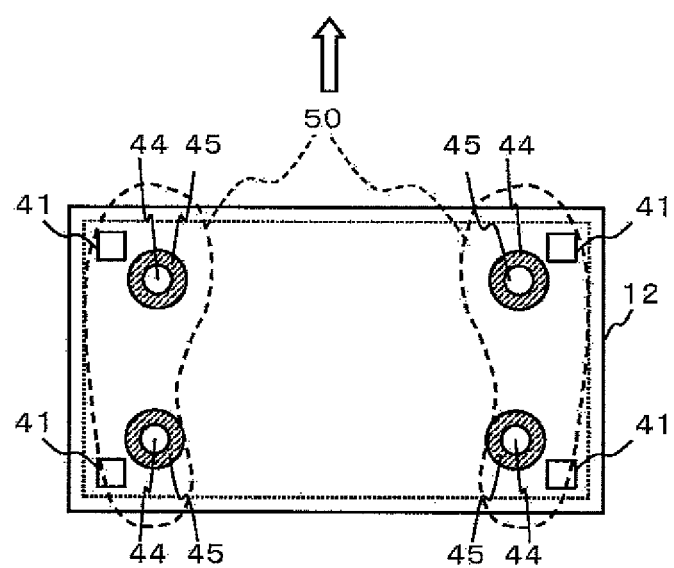
FIG. 5 is a plan view showing a relationship among a load sensor, a vibrator and a defined position according to one or more embodiments of the present invention.

FIG. 5 is a plan view showing a relationship among the load sensor 41, the vibrator 44 and the defined position of the upper cover 12 where a person rides. As shown in FIG. 5, the four load sensors 41 are provided in the vicinity of the four corners of the boarding base 10 (the chassis 11). Moreover, the four vibrators 44 are provided in close positions to the center from the four corners of the boarding base 10 (the upper cover 12), that is, the close positions to the center from the four load sensors 41.

The positions of the vibrators 44 are placed close to the center of the upper cover 12 from the load sensors 41 because the load sensors 41 are provided in the vicinity of the four corners of the boarding base 10. By providing the load sensors 41 on an inside of the four corners of the boarding base 10, it is not necessary to always place the position of the vibrator 44 close to the center from the load sensor 41 if there is a space for installing the vibrator 44 at an outside of the load sensor 41.

Moreover, a defined position 50 on which a person is to ride is a place where both feet are naturally positioned when the person rises on the upper cover 12 in a state in which the both feet are opened in an approximately shoulder length in parallel with each other. The vibrator 44 may be provided directly under the defined position 50. The two vibrators 44 may be provided in the vicinity of a portion directly under thenars of the both feet, and the two residual vibrators 44 may be provided in the vicinity of a portion directly under heels of the both feet. The reason is that a vibration generated by the vibrator 44 can easily be transmitted to the sole of the foot of the boarding person rising in the defined position 50. In one or more embodiments, moreover, the vibration blocking member 45 is provided around the vibrator 44. Therefore, any position where a vibration is generated by the vibrator 44 can easily be transmitted to the sole of the foot of the boarding person.

In the example shown in FIG. 5, for instance, a size of the boarding base 10 is designed such that a part of a tiptoe and a part of the heel are slightly protruded from the boarding base 10 when an adult male (an average value of a shoe size is 26.5 cm) rides on the defined position 50 of the boarding base 10. For example, the boarding base 10 may be constituted in an almost paper A4 size. The reason is that it is easier to take a center of gravity (or to carry out the center-of-gravity movement) in a slight protruding state of the tiptoe portion or the heel portion from the boarding base 10 as compared with a flat foot state in which a whole surface of the sole of the foot touches the boarding base 10.

If the boarding base 10 is constituted in the almost paper A4 size, moreover, the defined position 50 is placed in the peripheral part of the boarding base 10 as shown in FIG. 5. The peripheral part is a portion in which a strength of the upper cover 12 (a flexure resistance to weighting) is the greatest. Therefore, it is also possible to have an advantage that the upper cover 12 can be formed as thinly as possible, resulting in reduction in a weight.

When the weighting is applied to the upper cover 12, furthermore, a stress is generated on the chassis 11 by reaction thereof. When the boarding base 10 is constituted in the almost paper A4 size so that the defined position 50 is placed in the peripheral part of the boarding base 10, the stress generated by the weighting in the peripheral part is increased most greatly in the peripheral part of the chassis 11. Consequently, the chassis 11 itself is also flexed with difficulty. Therefore, it is also possible to form the chassis 11 as thinly as possible, thereby reducing the weight.

Figure 6:
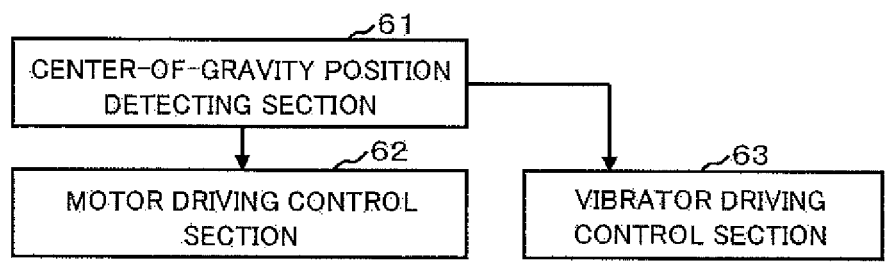
FIG. 6 is a block diagram showing an example of a functional structure provided in a control circuit according to one or more embodiments of the present invention.

The control circuit (not shown) accommodated in the boarding base 10 inputs a signal output from the load sensor 41, thereby carrying out the driving control of the motor and the driving control of the vibrator 44. FIG. 6 is a block diagram showing an example of a functional structure provided in the control circuit. As shown in FIG. 6, the control circuit provided in the one-man riding mobile apparatus according to one or more embodiments includes, as a functional structure thereof, a center-of-gravity position detecting section 61, a motor driving control section 62 and a vibrator driving control section 63.

The respective functional structures 61 to 63 can be implemented by all of a hardware configuration, a DSP (Digital Signal Processor) and software. For example, in the case in which they are implemented by the software, the respective functional structures 61 to 63 actually include a CPU, an RAM, an ROM and the like and can be implemented by an operation of a program stored in the RAM or the ROM. A recording medium storing the program is not restricted thereto.

Figure 7:
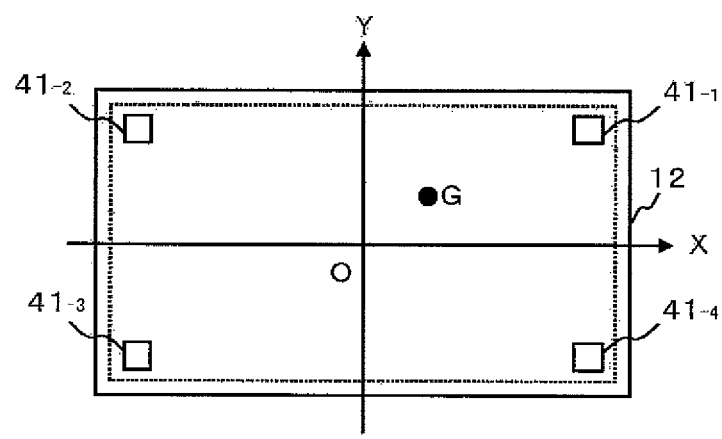
FIG. 7 is a view showing an example of a center-of-gravity position which is detected by a center-of-gravity position detecting section according to one or more embodiments of the present invention.

The center-of-gravity position detecting section 61 detects presence of weighting by the boarding person and a center-of-gravity position of the boarding person over the boarding base 10 based on signals output from the load sensors 41. More specifically, the center-of-gravity position detecting section 61 detects the presence of the weighting based on the signals output from the load sensors 41, and furthermore, detects the center-of-gravity position by an interpolating operation. FIG. 7 is a view showing an example of the center-of-gravity position detected by the center-of-gravity position detecting section 61. As shown in FIG. 7, two-dimensional coordinates (X-Y coordinates) with a center position of the boarding base 10 as an origin O are set onto the plane of the boarding base 10. In this case, all of the four load sensors 41 are positioned at an equal distance from the origin O.

Over the coordinate plane shown in FIG. 7, the load sensors 41 disposed in first to fourth quadrants are classified as designations $41_{-1}$ to $41_{-4}$ respectively. Loads (pressures) detected by the load sensors $41_{-1}$ to $41_{-4}$ are represented by $W_{-1}$ to $W_{-4}$, respectively. From the origin O to the respective load sensors $41_{-1}$ to $41_{-4}$, moreover, distances in an X-axis direction are represented by x (which are equal to each other) and distances in a Y-axis direction are represented by y (which are equal to each other).

In this case, a center-of-gravity position G ($x_G$, $y_G$) detected by the center-of-gravity position detecting section 61 is obtained based on signals $W_{-1}$ to $W_{-4}$ output from the respective load sensors $41_{-1}$ to $41_{-4}$.

$$x_G = x(W_{-1}+W_{-4})/W - x(W_{-2}+W_{-3})/W$$

$$y_G = y(W_{-1}+W_{-2})/W - y(W_{-3}+W_{-4})/W$$

$$W = W_{-1}+W_{-2}+W_{-3}+W_{-4}$$

The motor driving control section 62 controls the driving operation of two motors connected to the driving wheel 21 to be the front wheel depending on the presence of the weighting and the center-of-gravity position G of the boarding base 10 which are detected by the center-of-gravity position detecting section 61. In other words, the motor driving control section 62 drives the two motors to start the one-man riding mobile apparatus when the weighting is detected by the center-of-gravity position detecting section 61.

When the motor is driven to start the one-man riding mobile apparatus immediately after the weighting is detected by the center-of-gravity position detecting section 61 (immediately after the boarding person rides on the boarding base 10), however, there is a fear that the boarding person might lose balance. For this reason, the driving operation of the motor may be started in a predetermined time (for example, in 1.5 seconds) after the weighting is detected by the center-of-gravity position detecting section 61.

After the one-man riding mobile apparatus is started, the motor driving control section 62 controls an extent of a torque in which either of the two motors is to be driven depending on the center-of-gravity position G detected by the center-of-gravity position detecting section 61. More specifically, the motor driving control section 62 controls a steering angle by the driving operation of the motor depending on the X coordinate of the center-of-gravity position G and controls a running speed or a direction of movement by the driving operation of the motor depending on the Y coordinate of the center-of-gravity position G.

Figure 8:
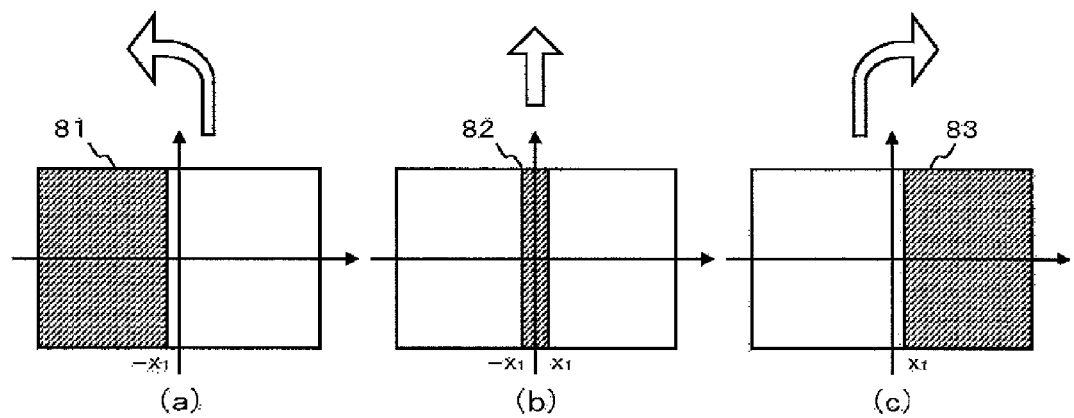
FIGS. 8(a)-(c) are views showing an example of control of a steering angle which is to be carried out by a motor driving control section depending on an X coordinate of the center-of-gravity position according to one or more embodiments of the present invention.

FIG. 8 is a view showing an example of the control of the steering angle which is to be carried out depending on the X coordinate of the center-of-gravity position G by the motor driving control section 62 according to one or more embodiments. Referring to the X coordinate of the center-of-gravity position G, for example, a portion from a negative maximum value to a positive maximum value is divided into three regions 81 to 83, and the torque of the motor is controlled such that a left turn is performed when the center-of-gravity position G is placed in the first region 81 in which a value of the X coordinate is the smallest negative value, a right turn is performed when the center-of-gravity position G is placed in the third region 83 in which the value of the X coordinate is the positive greatest value, and a direct advance is performed when the center-of-gravity position G is placed in the second region 82 therebetween as shown in FIG. 8.

In other words, in the case in which the X coordinate of the center-of-gravity position G approximates to zero (for example, in the case in which the center-of-gravity position G is placed in the second region 82 in which the value of the X coordinate is $-x_1$ to $+x_1$) as shown in FIG. 8(*b*), the motor driving control section 62 drives the two motors (that is, the left and right driving wheels 21) in an equal torque. Consequently, the one-man riding mobile apparatus advances directly.

In the case in which the value of the X coordinate of the center-of-gravity position G is smaller than $-x_1$ (in the case in which the center-of-gravity position G is placed in the first region 81) as shown in FIG. 8(*a*), moreover, the motor driving control section 62 drives the motor of the right wheel in a greater torque than the motor of the left wheel. Consequently, the one-man riding mobile apparatus turns in a leftward direction. At this time, an angle of the left turn is determined depending on a difference between left and right torques. The difference between the torques of the left and right motors is determined depending on the value of the X coordinate of the center-of-gravity position G.

In one or more embodiments, only the front wheel is set to be the driving wheel 21 and the rear wheel is set to be the caster 22. By driving only the motor of the right wheel without driving the motor of the left wheel, therefore, it is also possible to carry out a pivotal turn in a leftward direction in that place (a turn setting the non-driven left wheel as a rotation center). By driving the motor of the left wheel and the motor of the right wheel in an equal torque in reverse directions to each other, alternatively, it is also possible to carry out a counter pivotal turn in the leftward direction in that place (a turn setting centers of the two driving wheels 21 as rotation centers).

In the case in which the X coordinate of the center-of-gravity position G is greater than $x_1$ (in the case in which the center-of-gravity position G is placed in the third region 83) as shown in FIG. 8(*c*), moreover, the motor driving control section 62 drives the motor of the left wheel in a greater torque than the motor of the right wheel. Consequently, the one-man riding mobile apparatus turns in a rightward direction. At this time, an angle of the right turn is determined depending on a difference between left and right torques. Also in this case, the difference between the torques of the left and right motors is determined depending on the value of the X coordinate of the center-of-gravity position G. By driving only the motor of the left wheel without driving the motor of the right wheel, it is also possible to carry out the pivotal turn in the rightward direction. By driving the motor of the left wheel and the motor of the right wheel in an equal torque in reverse directions to each other, alternatively, it is also possible to carry out the counter pivotal turn in the rightward direction in that place.

Figure 9:
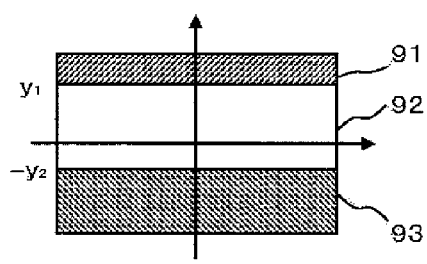
FIG. 9 is a view showing an example of control of a running speed or a direction of movement which is to be carried out by the motor driving control section depending on a Y coordinate of the center-of-gravity position according to one or more embodiments of the present invention.

FIG. 9 is a view showing an example of control of a running speed or an direction of movement which is to be carried out depending on the Y coordinate of the center-of-gravity position G Referring to the Y coordinate of the center-of-gravity position G, a portion from a negative maximum value to a positive maximum value is divided into three regions 91 to 93, and the torque of the motor is controlled such that acceleration is performed when the center-of-gravity position G is placed in the first region 91 in which a value of the Y coordinate is greater than $y_1$, deceleration is performed when the center-of-gravity position G is placed in the third region 93 in which the value of the Y coordinate is smaller than $-y_2$, and a speed is equal when the center-of-gravity position G is placed in the second region 92 therebetween as shown in FIG. 9.

The example of the control described therein is only illustrative. For example, the first to third regions 91 to 93 may be divided equally and the torque of the motor may be controlled such that forward movement is performed when the center-of-gravity position G is placed in the first region 91, stop is performed when the center-of-gravity position G is placed in the second region 92, and backward movement is performed when the center-of-gravity position G is placed in the third region 93. In this case, the motor driving control section 62 increases a positive torque to be applied to the motor when the value of the Y coordinate of the center-of-gravity position G is increased in the first region 91. Moreover, the motor driving control section 62 increases a negative torque to be applied to the motor when the value of the Y coordinate of the center-of-gravity position G is reduced (an absolute value is increased) in the third region 93.

The vibrator driving control section 63 controls the driving operation of the vibrators 44 depending on the presence of the weighting and the center-of-gravity position G which are detected by the center-of-gravity position detecting section 61. In other words, the vibrator driving control section 63 controls an extent of force in which any of the four vibrators 44 is to be driven depending on the presence of the weighting and the center-of-gravity position G which are detected by the center-of-gravity position detecting section 61.

More specifically, the vibrator driving control section 63 drives the four vibrators 44 to inform the boarding person of the start of the one-man riding mobile apparatus when the weighting is detected by the center-of-gravity position detecting section 61. For example, the vibrator driving control section 63 drives the four vibrators 44 twice every 0.5 second after the weighting is detected by the center-of-gravity position detecting section 61. The motor driving control section 62 starts to drive the motor after 0.5 second passes. Consequently, the boarding person can prepare for the start (a mental attitude or posture taking) while feeling rhythm by two vibrations transmitted to the sole of the foot through the vibrator 44 after riding on the boarding base 10.

After the one-man riding mobile apparatus starts, the vibrator driving control section 63 controls either of the left and right vibrators 44 which is to be driven depending on the X coordinate of the center-of-gravity position G and driving force thereof, and furthermore, controls either of the front and rear vibrators 44 which is to be driven depending on the Y coordinate of the center-of-gravity position G and driving force thereof. Moreover, driving rhythm, tempo, timing or the like may be controlled.

For example, the vibrator driving control section 63 drives the two vibrators 44 on the front side in the acceleration of the one-man riding mobile apparatus. At this time, the vibrator driving control section 63 drives the vibrator 44 while the acceleration is performed, and intermittently carries out the driving operation by changing the rhythm depending on a running speed like a beat in vibration rhythm of "ton, ton, ton, totototo", for example. When the highest speed is reached, the one-man riding mobile apparatus has a constant speed. For this reason, the vibrator driving control section 63 stops the driving operation of the vibrator 44 at that time.

In the deceleration of the one-man riding mobile apparatus, moreover, the vibrator driving control section 63 drives the two vibrators 44 on the rear side. At this time, the vibrator driving control section 63 drives the vibrator 44 while the deceleration is carried out, and continuously vibrates the vibrator 44, for example, causes the vibrator 44 to make a beep in vibration rhythm of "boo". Moreover, the vibrator driving control section 63 varies driving (vibration) force depending on a deceleration amount. For example, in the case in which the deceleration is greatly carried out, the vibrator 44 is vibrated largely.

In the turn in the rightward direction of the one-man riding mobile apparatus (which is not the pivotal turn or the counter pivotal turn), moreover, the vibrator driving control section 63 drives the two vibrators 44 on the right side, for example. At this time, the driving force is controlled in proportion to a distance from the origin O to the center-of-gravity position G for example. In the same manner as in the deceleration, the two vibrators 44 on the right side are continuously vibrated greatly with a beep in vibration rhythm of "boo" when a right turn is to be performed largely, for instance.

On the other hand, in the turn in the leftward direction of the one-man riding mobile apparatus (which is not the pivotal turn or the counter pivotal turn), the vibrator driving control section 63 drives the two vibrators 44 on the left side, for example. At this time, the driving force is controlled in proportion to the distance from the origin O to the center-of-gravity position G, for example. For instance, the two vibrators 44 on the left side are continuously vibrated greatly with a beep in vibration rhythm of "boo" when a left turn is to be performed largely.

In the pivotal turn or the counter pivotal turn of the one-man riding mobile apparatus, moreover, the vibrator driving control section 63 drives the four vibrators 44 in a rotating pattern in order.

The method of driving the vibrator 44 described above is only illustrative and the present invention is not restricted to the particular driving method. For example, in the turn of the one-man riding mobile apparatus (which is not the pivotal turn or the counter pivotal turn), the vibrator driving control section 63 may drive only one vibrator 44 on the front side (one of the left and right vibrators 44 depending on a turning direction) if the distance from the origin O to the center-of-gravity position G is equal to or smaller than a predetermined value (that is, if a turning accuracy is equal to or smaller than a predetermined angle), and may drive the two vibrators 44 on the front and rear sides (two vibrators 44 on the left or right side depending on the turning direction) if the distance from the origin O to the center-of-gravity position G is greater than the predetermined value (that is, if the turning accuracy is greater than the predetermined angle).

Furthermore, the vibrator 44 does not need to be always driven for a predetermined time immediately after the start of the one-man riding mobile apparatus regardless of the center-of-gravity position G As described above, even if the vibrator 44 is intermittently vibrated twice to give a notice of the start immediately before the start of the one-man riding mobile apparatus, there is a possibility that the center of gravity of the boarding person might be tilted toward the rear side by law of inertia immediately after the start. Accordingly, in one or more embodiments, the vibrator driving control section 63 may not drive the vibrator 44 for the predetermined time taken immediately after the start. Correspondingly, in one or more embodiments, the motor driving control section 62 may not perform the driving control (deceleration) of the motor depending on the center-of-gravity position G for the predetermined time taken immediately after the start but the driving control of the motor to carry out gradual acceleration to reach a certain speed.

As described above in detail, in one or more embodiments, there are provided the load sensors 41 disposed on the board-shaped boarding base 10, the vibrators 44 disposed on the boarding base 10 and the control circuit for carrying out the driving control of the vibrators 44. In the control circuit, the presence of the weighting through the boarding person and the center-of-gravity position G of the boarding person are detected based on the signals output from the load sensors 41, and the driving operation of the vibrators 44 is controlled depending on the presence of the weighting and the center-of-gravity position G which are detected.

According to one or more embodiments thus configured, when the boarding person rides on the one-man riding mobile apparatus to carry out running control by the movement of the center of gravity, the presence of the weighting to the load sensor 41 and the center-of-gravity position on the boarding base 10 at that time are detected and a vibration corresponding to the motion of the one-man riding mobile apparatus which is varied depending on the presence of the weighting and the center-of-gravity position is transmitted to the boarding person by the vibrators 44. Consequently, the boarding person can grasp the motion of the one-man riding mobile apparatus which is varied depending on the presence of the weighting or the center-of-gravity position by the vibration transmitted from a bottom of a foot, thereby steering the one-man riding mobile apparatus as intended by himself or herself.

In one or more embodiments, moreover, the plane of the boarding base 10 takes the almost rectangular shape in the approximately paper A4 size. Therefore, the defined position 50 on which the foot of the boarding person rides can be determined almost uniquely. The four vibrators 44 are provided directly under the defined position 50. Therefore, the motion of the one-man riding mobile apparatus which is varied depending on the presence of the weighting or the center-of-gravity position G can be transmitted clearly to the boarding person by the vibrators 44 in a number which is as small as possible. In one or more embodiments, moreover, the vibration blocking member 45 is provided around the vibrator 44. Therefore, any position in which the vibration is generated by the vibrator 44 can be transmitted more clearly to the boarding person.

Since the plane of the boarding base 10 has the almost paper A4 size, there is also an advantage that it is easy to get on/off the boarding base 10. In addition, this is very convenient to put the boarding base 10 in a bag or the like and carry them. According to the driving method by the motor driving control section 62, the motor is not driven when the person does not ride on the boarding base 10, and direct advance is started if the person rides on the boarding base 10 to move the center of gravity in a forward direction. Therefore, it is possible to easily employ a flexible using method of taking the one-man riding mobile apparatus according to one or more embodiments out of the bag and briefly getting thereon in a desirable place and briefly getting off the one-man riding mobile apparatus after running and putting the one-man riding mobile apparatus into the bag again, for example.

In one or more embodiments, moreover, there is employed the structure in which the upper cover 12 takes the shape of the box and is flexed with difficulty against weighting from above. Therefore, it is possible to prevent the upper cover 12 from being flexed to come in contact with the chassis 11 on the opposed surface other than the strut 43 when a person rides. Accordingly, it is not necessary to constitute the upper cover 12 by a metallic material having great rigidity or to excessively thicken the upper cover 12. Consequently, it is possible to contribute to reduction in the weight of the one-man riding mobile apparatus and to easily carry the one-man riding mobile apparatus in respect of the weight as well as the size.

Although there has been described the example in which the load sensor 41 is provided on the chassis 11, while the strut 43 is provided on the upper cover 12, the present invention is not restricted thereto. To the contrary, the strut 43 may be provided on the chassis 11, while the load sensor 41 may be provided on the upper cover 12.

Although there has been described the example in which the strut 43 is provided to prevent the upper cover 12 from being flexed to come in contact with the chassis 11, moreover, the present invention is not restricted thereto. For example, it is also possible to employ a structure in which a base having a predetermined thickness is provided on four corners of the chassis 11 or the upper cover 12 (positions in which the load sensor 41 and the aluminum plate 42 are provided) so that the opposed surfaces of the chassis 11 and the upper cover 12 are brought into a non-contact state over a surface other than the base.

Although there has been described the example in which the four load sensors 41 are provided, moreover, this is only illustrative and the present invention is not restricted to the number. Although there has been described the example in which the four vibrators 44 are provided, furthermore, this is only illustrative and the present invention is not restricted to the number. Although there has been described the example in which the driving wheel 21 is driven by the two motors, moreover, this is only illustrative and the present invention is not restricted to the number.

Although there has been described the example in which the two front wheels and the two rear wheels in the four wheels are set to be the driving wheels 21 and the casters 22, furthermore, the present invention is not restricted thereto. For example, the front wheel and the rear wheel may be reversed. In addition, the four wheels may be configured from the driving wheels 21. If all of the four wheels are configured from the driving wheels 21, however, it is necessary to additionally provide a motor, resulting in an increase in the weight of the one-man riding mobile apparatus. Moreover, in one or more embodiments, there may be a disadvantage that a pivotal turn or a counter pivotal turn cannot be performed due to friction of the wheel 21, the wheel 21 is damaged by application of a great load thereto or a floor is damaged. In consideration of these respects, two of them may be set to be the driving wheels 21 and two residual ones may be set to be the casters 22 which can be rotated by 360 degrees.

In addition, the one or more embodiments discussed herein are only illustrative for concreteness to carry out the present invention and the technical scope of the present invention should not be thereby construed to be restrictive. In other words, the present invention can be carried out in various configurations without departing from the gist or main features thereof.

Explanation of Designation
 10 boarding base
 11 chassis
 12 upper cover
 21 driving wheel
 22 caster
 41 load sensor
 42 aluminum plate
 43 strut
 44 vibrator
 45 vibration blocking member
 50 defined position in which person rides
 61 center-of-gravity position detecting section
 62 motor driving control section
 63 vibrator driving control section

The invention claimed is:

1. A one-man riding mobile apparatus comprising:
a plurality of wheels;
a board-shaped boarding base to which the wheels are attached;
a motor that drives at least a part of the wheels and provided on the boarding base;
a plurality of load sensors provided on the boarding base;
a plurality of vibrators provided on the boarding base; and
a control circuit that performs driving control of the motor and driving control of the vibrators,
wherein the control circuit is provided on the boarding base and comprises:
 a center-of-gravity position detecting section that detects presence of weighting and a center-of-gravity position based on signals output from the load sensors;
 a motor driving control section that controls a driving operation of the motor depending on the presence of the weighting and the center-of-gravity position detected by the center-of-gravity position detecting section; and
 a vibrator driving control section that controls a driving operation of the vibrators based on the presence of the weighting and the center-of-gravity position detected by the center-of-gravity position detecting section.

2. The one-man riding mobile apparatus according to claim 1, wherein
the vibrators are provided in opposed positions to a sole of a foot when a person rides on a defined position of the boarding base, and
the vibrator driving control section controls an extent of force to drive any of the vibrators depending on the presence of the weighting and the center-of-gravity position which are detected by the center-of-gravity position detecting section.

3. The one-man riding mobile apparatus according to claim 1, wherein a vibration blocking member for blocking transmission of a vibration generated by the vibrators is provided around the vibrators, respectively.

4. The one-man riding mobile apparatus according to claim 1, wherein the boarding base has a plane configured in a rectangular shape having a size substantially equal to an A4-sized sheet of paper.

5. The one-man riding mobile apparatus according to claim 4, wherein
the load sensors are provided in the vicinity of four corners of the boarding base, and the center-of-gravity position detecting section detects the center-of-gravity position by an interpolating operation based on the signals output from the load sensors.

6. The one-man riding mobile apparatus according to claim 1, wherein
the boarding base is configured from a chassis for accommodating the motor and the control circuit and an upper cover to be put on the chassis, and
the upper cover takes a shape of a box in which almost perpendicular side walls to the board are provided on four sides of a board taking an almost rectangular shape.

7. The one-man riding mobile apparatus according to claim 6, wherein the load sensors are provided on either the chassis or the upper cover and a base is provided in a position in which the load sensor is to be disposed, and opposed surfaces of the chassis and the upper cover are brought into a non-contact state over a surface other than the base.

8. The one-man riding mobile apparatus according to claim 6, wherein the load sensors are provided on either the chassis or the upper cover and a strut is provided in opposed positions to the load sensors through either the chassis or the upper cover, and opposed surfaces of the chassis and the upper cover are brought into a non-contact state over a surface other than the strut.

9. The one-man riding mobile apparatus according to claim 1, wherein the plurality of wheels are four wheels configured from two driving wheels to be driven independently by two motors respectively and two casters.

10. The one-man riding mobile apparatus according to claim 2, wherein a vibration blocking member for blocking transmission of a vibration generated by the vibrators is provided around the vibrators, respectively.

11. The one-man riding mobile apparatus according to claim 2, wherein the boarding base has a plane configured in a rectangular shape having a size substantially equal to an A4-sized sheet of paper.

12. The one-man riding mobile apparatus according to claim 3, wherein the boarding base has a plane configured in a rectangular shape having a size substantially equal to an A4-sized sheet of paper.

13. The one-man riding mobile apparatus according to claim 2, wherein
the boarding base is configured from a chassis for accommodating the motor and the control circuit and an upper cover to be put on the chassis, and
the upper cover takes a shape of a box in which almost perpendicular side walls to the board are provided on four sides of a board taking an almost rectangular shape.

14. The one-man riding mobile apparatus according to claim 3, wherein
the boarding base is configured from a chassis for accommodating the motor and the control circuit and an upper cover to be put on the chassis, and
the upper cover takes a shape of a box in which almost perpendicular side walls to the board are provided on four sides of a board taking an almost rectangular shape.

15. The one-man riding mobile apparatus according to claim 4, wherein
the hoarding base is configured from a chassis for accommodating the motor and the control circuit and an upper cover to be put on the chassis, and
the upper cover takes a shape of a box in which almost perpendicular side walls to the board are provided on four sides of a board taking an almost rectangular shape.

* * * * *